ERROR CORRECTING AND REPAIRABLE DATA PROCESSING STORAGE SYSTEM

Filed June 21, 1966 Sheet 1 of 2

INVENTORS
JAMES H. POMERENE
RICHARD W. MELVILLE
BY Robert W. Berray
ATTORNEY

ERROR CORRECTING AND REPAIRABLE DATA PROCESSING STORAGE SYSTEM 3,436,734
ERROR CORRECTING AND REPAIRABLE DATA PROCESSING STORAGE SYSTEM

James H. Pomerene, Poughkeepsie, and Richard W. Melville, Candor, N.Y., assignors to International Business Machines Corporation, Armonk, N.Y., a corporation of New York Filed June 21, 1966, Ser. No. 559,238
Int. Cl. G11b 13/00
U.S. Cl. 340—172.5 5 Claims

ABSTRACT OF THE DISCLOSURE

A storage system in a data processing system is comprised of $m$ memory modules wherein each of the $m$ memory modules contain a single binary bit of an $m$-bit word utilized in the data processing system. Each of the memory modules contains its own memory address register, control means, and read-out means which respond to address information from the data processing system for transferring data to or from the data processing system. Incorporated in the storage system is the capability of correcting errors in the data words. The resulting storage system configuration permits the continued use of the storage system during the time a faulty memory module is being removed and replaced.

This invention relates to a data processing system storage configuration, and more particularly to a storage configuration wherein the failure of a portion of the storage system does not prevent continued operation of the data processing system while the failed portion of the storage system is replaced or repaired.

Certain special systems employ two or more processing units to increase the probability that at least one unit will be available at all times. A failure in these systems will generally result in some loss of data in their storage which must be recomputed. If the failure is in a storage unit, the data loss can be severe and there can be substantial system outage.

Protection against some types of data processing system storage failures has been provided by including, in each computer word accessed from the storage system, redundancy bits which permit correction of any single bit error. However, many kinds of failures result in multiple errors which cannot be corrected. In particular, some failures may result in loss of the entire storage contents.

A recent trend in memory design for data processing systems is the definition and construction of a Basic Operational Memory (BOM). Each BOM is constructed as a three dimensional memory system which incorporates all the necessary circuits to operate a basic three dimensional core array. At least one type of BOM being constructed is comprised of a three dimensional core array having 4096 addressable locations. Eighteen core planes are provided whereby each addressable location permits the storage of 18 binary bits. Each BOM contains an address register, the necessary address decoding circuits, drivers, sense lines and amplifiers, memory data register, and inhibit lines. The basic cycle for each BOM is the decoding of an $x$ coordinate address and a $y$ coordinate address to first perform a read operation at an addressed location. This tends to switch all the cores to a predetermined state and provides a read-out on the 18 sense lines to be temporarily stored in the memory data register. If the BOM has been selected for reading, the data in the memory data register is made available to the data processing system. The contents of the memory data register are also utilized to energize inhibit windings which thereby permit the regeneration of the data previously destroyed at the addressed location during read-out. Whenever the data processing system is to store information in an addressed location, the same cycles are taken. However, after read-out from the addressed location, data which is to be stored is inserted in the memory data register for energizing the inhibit lines to thereby store new information at the addressed location.

With the advent of the concept of using BOM's, a data processing system which, for example, requires a 32-bit computer word, would combine two BOM's in a bank. The data processing system address register contents would be applied to the memory address register in each BOM thereby providing access to 18 data bits from each of the two BOM's. A basic data unit finding common use is an 8-bit byte plus a parity bit. In the assumed system described above, each BOM would provide two 8-bit bytes, each with a single parity bit for error detection. Therefore, when the two BOM's are accessed by the same address, the bank provides to the data processing system four 8-bit bytes each byte having a parity bit for error detection purposes.

Apart from cooling and power system faults, any other failure in such a composite storage system will be within a single BOM, leaving all other BOM's unaffected and operating correctly. This property is of little use in conventional storage systems, since the information stored in the failing BOM is lost and, until the BOM is repaired, the storage system is useless. In certain storage systems, it has become common practice to assemble four BOM's in a bank to produce a storage system which thereby produces a computer word having eight 8-bit bytes each with a parity bit. Therefore, if a single one of the BOM's should fail, 16 data bits in each computer word in the storage bank would be destroyed or be inaccessible. The entire data processing system must be shut down, the memory repaired, and all of the data in the storage system at the time of failure must be reconstructed.

It is an object of this invention to provide a data processing system storage arrangement which can be classified as a "fail-softly" system, defined as a system which permits continued operation of the entire data processing system even though a portion of the storage system has failed.

It is also an object of this invention to provide a fail-softly data processing system wherein data accessed from the storage system, which has a failed portion, can be corrected prior to transfer to the data processing system.

It is an additional object of this invention to provide a fail-softly data processing system wherein continued operation of the system is possible by correcting erroneous data produced by a failed portion of a storage system, and which permits continued operation while the failed portion of the storage system is removed and repaired or replaced.

It is a further object of this invention to provide a fail-softly data processing system which has a storage system which permits replacement or repair of a failed portion of the storage system and which provides, for each access to the storage system, a plurality of computer words for processing by the system.

The above objects and other features and advantages are realized in a preferred embodiment of the invention wherein a data processing system storage arrangement utilizes a multi-BOM system in an unconventional fashion. Most single system failures are confined to one BOM, and, in accordance with the invention, this can be exploited to permit error-free operation to continue in the data processing system throughout the failure and subsequent repair or replacement of the affected BOM.

The basic concept is to identify each BOM in the storage system with one and only one bit position of the processing system data word. That is, the high order bits of all words are stored in one BOM, the next highest order bits in the next BOM, etc. In a preferred emodiment of the invention, 32 BOM's are arranged to produce a 32-bit data word. Extra bits, stored in extra BOM's, provide for single error correction. Using the Hamming Code, for example, six additional bits per 32-bit data word will allow detection and correction of any single bit error in either the data word or the extra bits. One further bit can detect a double error.

All BOM's are referenced in parallel with the same address from a data processing system address register. Since each BOM, if it is an existing design, will read out more than one bit, each access to the total array will yield a block of data words.

Transfer control means are provided between the memory data register of each of the BOM's and the central processing unit. Error detecting and correcting circuits are provided in the transfer path to detect single and double errors and correct single errors during the transfer of a complete computer data word from coresponding positions in the memoy registers to the data processing system. Further, the transfer path may include a buffer memory which will permit the storage of the block of data in convenient and easily accessible form to the central processing unit. The transfer control between the memory data registers and the error detecting and correcting circuits and buffer memory includes means for transferring a computer word to the buffer memory by sequentially sampling the same relative positioned binary bits in all of the memory data registers such that the normal 39-bit computer word, including error detecting and correcting bits, can be transferred to the buffer memory for use by the central processing unit of the system.

The foregoing and other objects, features and advantages of the invention will be apparent from the following more particular description of a preferred embodiment of the invention, as illustrated in the accompany drawings.

Figure 1:
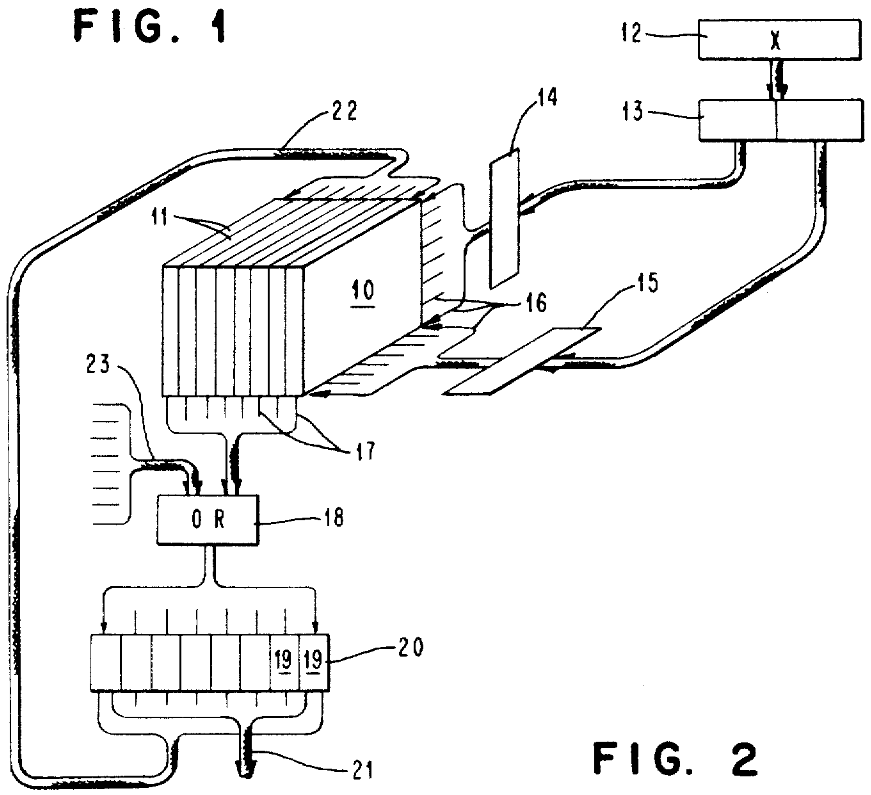
FIGURE 1 is a schematic representation of a basic Operation Memory (BOM) showing a three dimensional array and necessary circuits for accessing and reading out or storing data at addressable locations in the array.

FIGURE 1 depicts schematically a representation of a three dimensional core memory array with associated control circuits which comprise a Basic Operational Memory (BOM). The exact details of a BOM are not essential to an understanding of the present invention and any member of BOM designs can be incorporated into the present invention. Shown in FIGURE 1 is a BOM consisting of a magnetic core array 10 which, for purposes of description, is assumed to have 8 magnetic core planes 11. When access to data in the core array 10 is desired, a number $x$ of address bits will have been provided in a data processing system address register 12. These $x$ address bits will be transferred to a memory address register 13 contained in the BOM. One-half of the address bits will be transferred to a decoding circuit 14 and the other half of the address bits will be transferred to a decoding circuit 15. It is the function each of the decoding circuits 14 and 15, and associated drivers, to drive one out of a plurality of lines 16 at the output of the decoders 14 and 15, to address the core array 10. The address lines 16 when energized, select for reading or storing all of the magnetic cores at the intersection of these lines throughout all of the planes 11 of the array 10. If it is assumed that the number of address bits in address register 12 is $x$ bits, each core plane 11 in the array 10, will have $2^x$ addressable locations.

To simplify the drawing, only eight core planes 11 have been shown in the three dimensional array 10. It should be easily recognized that this can be any desired number. Associated with each core plane 11 in the array 10, is a sense line 17. When the address lines 16 have been energized, the magnetic cores at the intersection of the two coordinate line swill be switched when the core represents a binary 1. Cores representing binary 0 will not be switched. The switching of the core at the intersection of the address lines 16 produces a signal on its associated sense line 17 which is transmitted through an OR circuit 18 to a corresponding binary storage element 19 in a memory data register (MDR) 20. Therefore, at the completion of addressing a coordinate in all of the planes, the binary information contained in the planes 11 at the same coordinate throughout the array, will be stored in the memory data register 20. The data manifested in the register 20 can be transferred to a data processing system on signal lines 21 associated with each binary storage element.

Magnetic core arrays operate on a destructive read-out basis such that the information read out of the addressed location to the memory data register 20 must then be written back into the addressed location. The binary 1 or binary 0 condition stored in each binary storage element 19 of the memory data register 20 is sent back to the core array on "inhibit lines" 22. Therefore, a write cycle is initiated which tends to switch all of the cores at the addressed location to binary 1. Those planes receiving an inhibit signal from a storage element 19 having binary 0 stored therein will be prevented from switching.

When data from the central processing unit (CPU) is to be stored in an addressed location, the data processing system presents the data on a number of lines labeled 23 through the OR circuit 18 to the memory data register 20. The same read followed by a write cycle is accomplished by the controls in the memory; however, during the read cycle, the data sensed on the sense lines 17 is not transferred onto the data processing system. Rather, the data which is to be stored is transferred on lines 23 through the OR circuit 18 into the storage elements 19 of the memory data register 20. Then during the write cycle, the inhibit lines 22 cause the cores in each plane 11 to be switched or not depending on the data to be stored.

Figure 2:
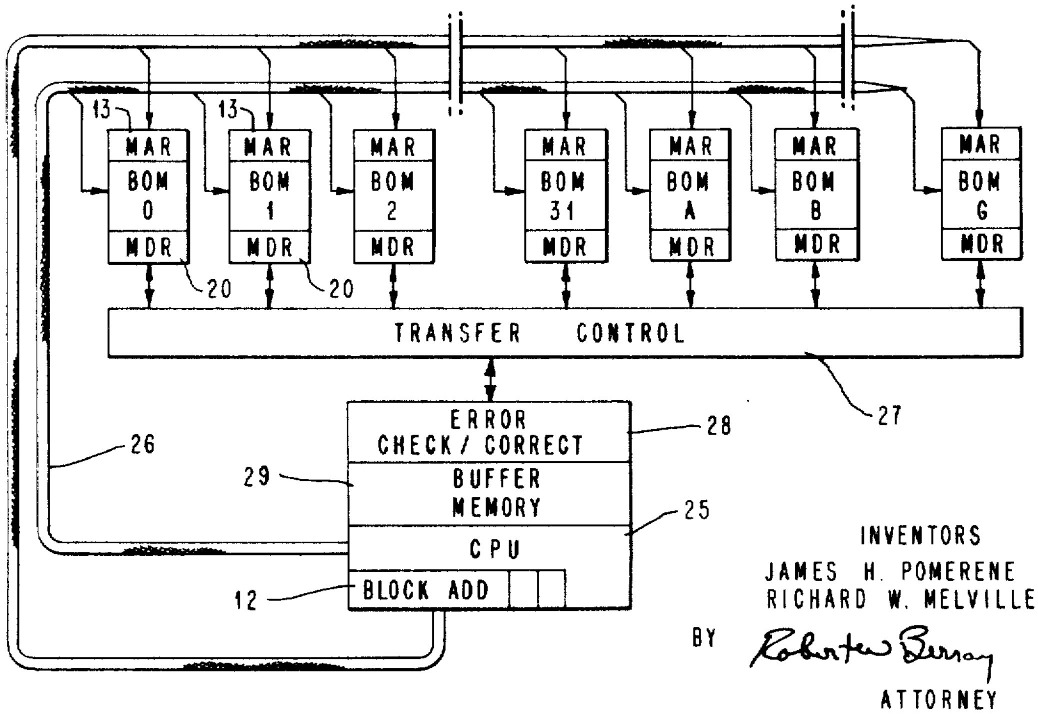
FIGURE 2 is a block diagram showing the arrangement of a plurality of BOM's depicted in FIGURE 1 in accordance with a preferred embodiment of the invention.

FIGURE 2 depicts in block diagram form the arrangement of a plurality of BOMs such as the one described in FIGURE 1 to practice the subject invention. The number of BOMs so connected is equal to $m+n$, where $m$=the No. of data bits, and $n$=the number of error detecting and correcting bits. As indicated previously, the preferred embodiment of the invention will be described in relation to a data processing system which operates on computer words having $m=32$ data bits, 0 through 31, and $n=7$ error detecting and correcting check bits, A through G. It is a feature of the present invention that bit 0 of each computer word will be contained in BOM 0, bit 1 of each computer word will be contained in BOM 1, etc. It will be recalled that each of the BOMs depicted in FIGURE 2 is a three dimensional magnetic core array having a memory address register (MAR) 13 and a memory data register (MDR) 20. To simplify description, each BOM is assumed to contain eight core planes which therefore cause each access of a BOM to read out eight binary bits to the memory data register.

Parts of the structure shown in FIGURE 2 which are the same as that described in connection with FIGURE 1 have been similarly labeled. There is shown in block diagram form in FIGURE 2 the data processing system address register 12 which is contained in a central processing unit (CPU) 25 of the data processing system. The necessary controls for selecting and starting the timing circuits of each of the BOMs is sent by cable 26 to each of the BOMs from the CPU 25. It can be seen, in connection with FIGURE 2, that each of the memory address registers 13 in each of the BOMs receive the same address bits from the data processing system address register 12. Therefore, the same relative location in all of the 39 BOMs is addressed simultaneously, and the controls initiated by the CPU simultaneously read-out eight binary bits from each BOM to its associated memory data register 20.

At this point, the memory data registers 20 contain eight 39-bit binary words in response to the single address and access control to the BOMs. To be more fully described in connection with FIGURES 3 and 4, a transfer control section 27 is provided for selecting the same relative positioned binary bits from all of the memory data registers 20 to read out the 39 binary bits associated with a single computer word. The 39-bit computer word is transferred out of the memory data registers 20 through error checking and correcting circuits 28. The error checking and correcting circuits 28 have not been described in detail but can be of any desired implementation. For example, a Hamming type error detection and correction circuit has the capability of detecting single and double errors in the data and correcting all single errors. Also, to be more fully described, once a 39-bit computer word has been corrected if necessary, it is transferred on to a buffer memory 29 which will have the function of storing eight 39-bit computer words for use by the central processing unit 25.

The transfer control 27 has an essential function, the ability to take the binary contents of position zero from each of the memory data registers 20 and transfer them simultaneously to the buffer memory 29. Therefore, binary storage element 0 in each of the memory data registers is used to make up a word 0. Likewise, memory data register storage element 3 in each of the memory data registers is read out simultaneously to form computer word 3 for use in the CPU 25.

Figure 3:
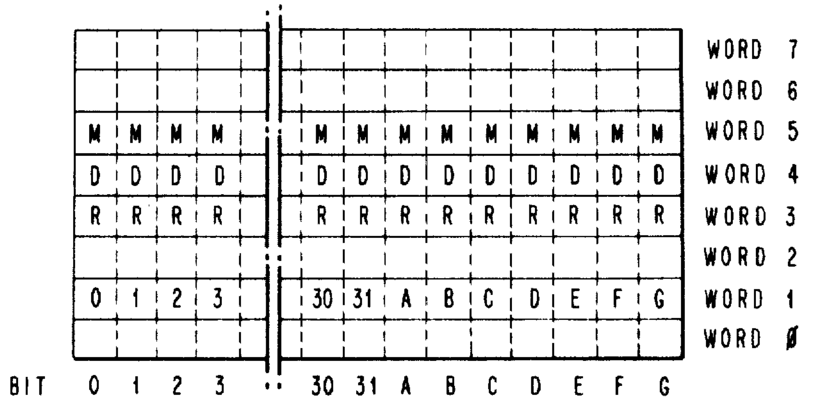
FIGURE 3 is a schematic representation of a block of data to be transferred between the memory system and a data processing system, and further schematically represents the two dimensional configuration of a buffer memory.

FIGURE 3 depicts schematically the memory data registers 20 in a two dimensional configuration. There is shown 39 memory data registers 20 each having eight storage elements. Once the data in the memory data registers 20 has been transferred by the transfer control 27 of FIGURE 2, the buffer memory 29 will contain the block of binary data as depicted in FIGURE 3. Namely, the buffer memory 29 will have 39 columns of buffer storage devices arranged in eight rows. With the necessary gating arrangements applied to each of the squares shown in FIGURE 3, there will be means by which data can be transferred between the memory data registers 20 and the buffer memory 29 or between the buffer memory 29 and the CPU 25. Details of a two dimensional buffer memory 29 have not been shown. Since central processing units of data processing systems operate at electronic circuit speeds, it would be desirable to construct the buffer memory utilizing electronic circuits such that the speed of operation of the buffer memory 29 can be made compatible with the speed of operation of the CPU 25.

Figure 4:
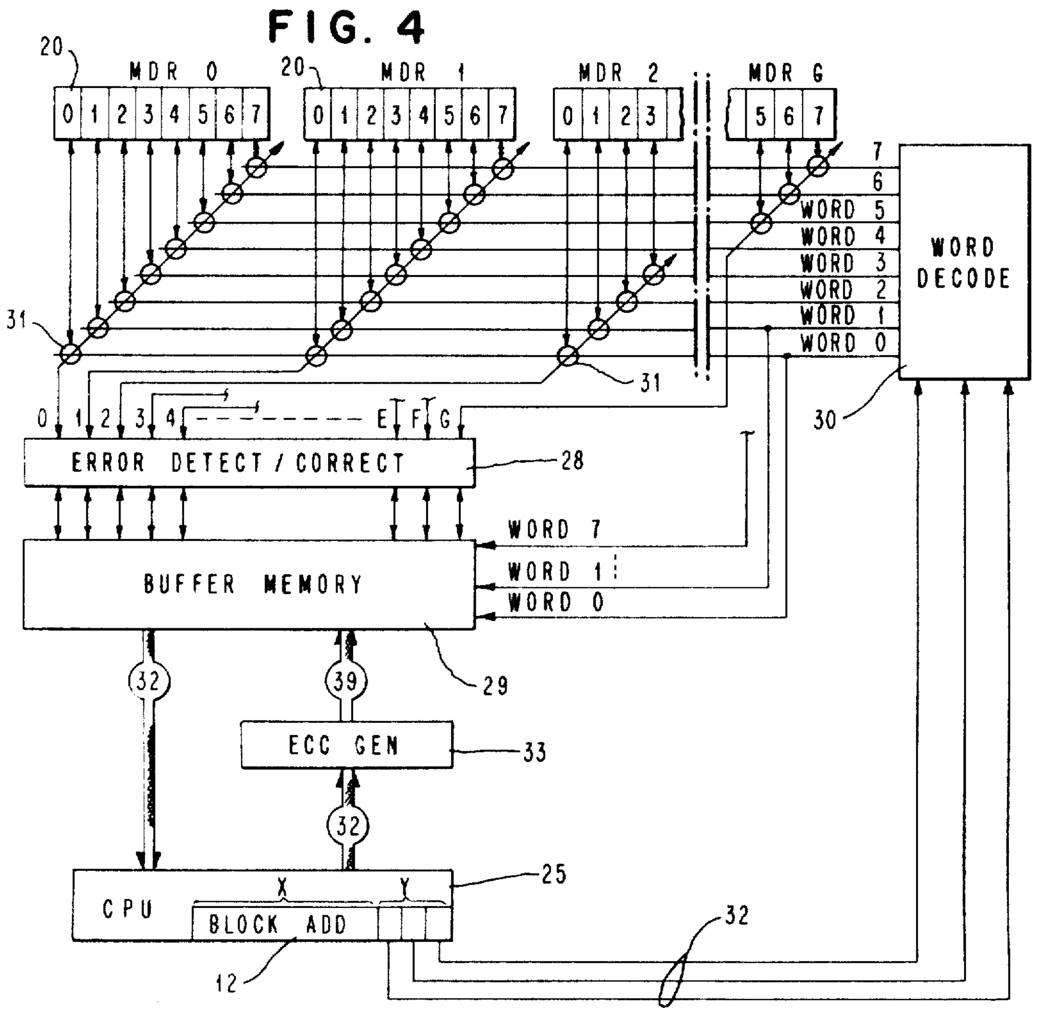
FIGURE 4 shows in more detail, the transfer control shown in FIGURE 2 which transfers computer words between the memory system and the central processing unit of the data processing system.

In FIGURE 4 is shown more detail concerning the transfer control mechanism 27 of FIGURE 2. It is the function of the transfer control 27 to transfer the 39-bit computer words from the corresponding storage element locations of each memory data register 20 through the error detection and correction circuit 28 to the buffer memory 29. Previous descriptions of the data processing system address register 12 discussed the manner in which $x$ address bits were utilized to access $2^x$ addressable locations in the storage device. In addition to the $x$ bits of address, there are provided $y$ additional address bits. In the preferred embodiment shown, each access to the main storage system provides eight 39-bit computer words. The $y$ address bits, which would be provided in the preferred embodiment, would equal three to provide $2^3$ separate selection signals for transferring the eight computer words from the memory data registers 20 to the buffer memory 29 in sequence from word 0 through 7. The address register 12 can be constructed for counting in the three low order bits or a separate 3-bit counter can be probided as a means by which the 39-bit computer words can be transferred in sequence. The permutation of $y$ address bits are applied by lines 32 to a word decode circuit 30, which in response to the $y$ address bits, will provide $2^y$ word selection signal outputs.

As a part of the transfer control mechanism, there are provided 39 sets of gating elements 31 shown schematically in FIGURE 4 as circles at the intersection of lines. Each set of gates 31 is associated with one memory data register 20. To simplify the description, only one set of gates 31 has been shown but it should be pointed out that the representation is utilized to represent gates reading from the memory data registers 20 to the buffer memory 29 or from the buffer memory 29 to the memory data registers 20.

When the $x$ address bits, which provide the address of the block of data, have been transferred to the memory address registers 13 of each of the BOMs, and the controls of the CPU 25 have initiated a fetch of data data registers. It should be clear at this time, that memory data registers 20, the word decoding network 30 will sequentially produce word selection output signals starting at word 0 and ending at word 7. It will be noted that all of the gates 31 in the set of gates associated with a memory data register 20 provide outputs and receive inputs from the same column of the buffer memory 29 as represented in FIGURE 3. For example, MDR 0 will sequentially transfer to the buffer memory 29, bit 0 of each of the eight computer words stored therein. Further, in response to each word selection output signal produced by the word decode network 30, corresponding gates 31 in all of the 39 sets of gates are energized to simultaneously transfer the bits associated with a particular computer word to the buffer memory 29.

The word selection output signal from word decoder 30 which energizes the gates 31 is also utilized to condition the proper row of buffer storage devices in the buffer memory 29 to either receive a computer word from the memory data registers 20 or to transfer a computer word from the buffer memory to the memory data registers. It should be clear at this time, that word 0 is comprised of binary bits stored in binary storage element 0 in each of the memory data registers 20. Likewise, computer word 3 is comprised of binary bits stored in binary storage element 3 of the memory data registers 20.

Also shown in FIGURE 4 is an error checking and correcting bit generator 33 which has been placed between the CPU 25 and the buffer memory 29. In the process of storing data into the memory system, 32-bit data words from the CPU 25 will be applied to the generator 33 for generating the necessary check bits A through G to provide error detecting and correcting properties to the computer words.

Therefore, it can be seen that in response to an address of $x$ bits in the data processing system address register 12, eight 39-bit computer words are accessed from the 39 separate BOMs to the memory data registers 20. Thereafter, computer word 0 through computer word 7 is sequentially transferred through the error detection and correction circuit 28 to the buffer memory 29. During the transfer of the data to the buffer memory 29, any errors detected by the error detection and correction circuit can be signalled and stored. All single errors may be corrected in accordance with the Hamming Code, utilizing the error detecting and correcting check bits A through G. It is the primary function of this invention to permit continued use of the data processing system even though a particular one of the BOMs has failed. It should be clear that if a single BOM fails during the data processing system operation, the error detection and correction check bits can correct the error. All of the computer words found in the storage system may have a single bit in error but this can be corrected and operation continued. Furthermore, since the BOMs are independent units the connections to the control lines, address lines, and data lines can be broken, the defective BOM removed and repaired or replaced by a good BOM.

A serious fault in prior storage systems is the fact that when a storage element fails, the data is lost and must be reentered. With the subject invention, the data in the replaced BOM can be regenerated during the process of operation by utilizing the error detection and correction check bits. This will permit the data to be read out of the storage system through the error detection and correction circuits 28 to the buffer memory 29 for use in the central processing unit or by utilizing a special program which will first read out all of the data in the storage device regenerating the single bit which had been erased in the failing BOM.

Modifications

Various skill of the art changes can be made in the above described preferred embodiment. The buffer memory 29 shown in FIGURES 2 and 4 could be eliminated, utilizing the memory data registers 20 in the BOMs as the buffer. In this mode of operation, each computer word required by the CPU 25 would be transferred directly from the memory data registers 20, through the error detecting and correcting circuits 28, to the central processing unit 25.

Further, several buffer memories 29 could be provided thereby making possible the buffering of several blocks of data for use by a CPU. This would require fewer accesses to the storage system by the central processing unit. The plural buffer memory concept could permit a greater degree of overlap between CPU operations and memory operations. Several blocks of data for use by the CPU can be contained in several buffer memories and when a particular buffer memory has been freed from use by the CPU, additional memory accesses can be made for further blocks of data while the CPU is operating on other buffered data and instructions.

A further modification which could be made, would be to provide one master data processing system address register 12 for accessing the block of data for transfer to the buffer memory 29. Thereafter, each row of the buffer memory 29 could be assigned a particular one of a plurality of CPUs 25 to simultaneously transfer 39-bit computer words from the buffer memory 29 to the CPUs 25.

The preferred embodiment of the invention has shown each BOM to consist of a three dimensional core array. This should not be considered limiting, in that there would be no restriction to designing each BOM to be a single plane of storage devices whereby each access to storage reads out only a single binary bit from each BOM either to a single binary storage element in a memory data register 20 or directly to the buffer memory or system. This would, however, necessitate more accesses to the memory system by the central processing unit 25.

As disclosed in FIGURE 4, the data operated on by the CPU 25 consists only of the 32 data bits after the 7 error detecting and correcting check bits have been utilized to correct data for entry into the buffer memory 29. There is no restriction on the placement of the error detecting and correcting circuit 28 in that it could be placed between the buffer memory 29 and the CPU 25 whereby data would be error detected and corrected during the transfer from the buffer memory to the CPU 25.

There has thus been shown, a data processing system which has associated therewith a storage system for transferring plural-bit binary words between a CPU and storage system, with each computer word including $m=32$ data bits and $n=7$ error detection and correction bits. An address for data provided by a data processing system address register having $x$ bits provides simultaneous access and control of a plurality of memory modules, there being one memory module for each of the $m+n=39$ bits in a computer word. Each of the memory modules contains the same relative positioned binary bit for all of the computer words in the storage system. Each memory module includes an address register and a memory data register which temporarily stores binary information fetched from or for storage in a location addressed by the data processing system address register. Each of $2^x$ address locations in each of the memory modules may contain $2^y$ binary storage elements or cores. Each memory data register will contain an equal plurality of binary storage elements. Each access to the storage system therefore fetches or stores $2^y$ computer words each comprised of $(m+n)$ binary bits. Transfer means, responsive to $y$ address bits, are provided between the memory data registers and the central processing unit. The transfer path includes gates, error detection and correction circuits, a buffer memory, and a decoding means which permits the transfer of a single computer word from the memory data registers to a particular location in the buffer memory. The decoding and gating means are effective to condition one out of $2^y$ rows of $m+n$ buffer storage devices in the buffer memory and to transfer one binary bit between each of the memory data registers and the selected row. The binary bit or storage element transferred has the same relative position in all of the memory data registers.

While the invention has been particularly shown and described with reference to a preferred embodiment thereof, it will be understood by those skilled in the art that the foregoing and other changes in form and details may be made therein without departing from the spirit and scope of the invention.

We claim:

1. A data processing system which includes means for storing or fetching plural-bit binary words at locations in a storage system, said plural-bit binary word including $m$ data bits, comprising in combination:

data processing system control signalling means including an address register for specifying a particular one of a plurality of addressable locations in the storage system;

a plurality of memory modules, there being one memory module for each of the $m$ bits in a binary word;

electrically independent memory control means for each said memory module, including memory addressing means connected to said system address register, for selectively storing or fetching binary information at an addressed location;

said memory control means for each said memory module being operable in parallel for selecting the same relative addressed location in each said memory module under control of said data processing system control signalling means;

memory read-out means for each said memory module, for manifesting binary information fetched from, or for storage in, an addressed location;

and transfer means connected between said memory read-out means and the data processing system, including error detection and correction means for generating signals indicative of detected errors in the binary word transferred, and for correcting correctable errors.

2. A system in accordance with claim 1 wherein:
each addressed location of each said memory module and each said memory read-out means is comprised of a plurality of binary storage elements;
and said transfer means includes gating means for transferring binary manifestations between similarly positioned storage elements in each of said memory read-out means and said data processing system.

3. A system in accordance with claim 2 wherein:
said data processing system address register is comprised of $x+y$ binary address bits;
said memory addressing means in each of said memory modules is comprised of $x$ binary address bits providing access to $2^x$ addressable locations;
and each said addressed location and memory read-out means is comprised of $2^y$ binary storage elements;
whereby each address registered in said data processing system address registers provides access to the storage system for the storing or fetching of $2^y$ binary words, each comprised of $m$ binary bits.

4. A system in accordance with claim 3 wherein said transfer means further includes:
buffer storage devices, schematically configured in a two dimensional matrix having $m$ columns and $2^y$ rows;
and said transfer gating means include means for transferring binary data between each memory read-out means and an associated column of said buffer storage devices;
the binary data in binary storage elements in said memory read-out means, similarly positioned, being transferred to the same row of buffer storage devices.

5. A system in accordance with claim 4 wherein:

said transfer gating means is comprised of $m$ sets of $2^y$ gates, each gate in each set being operatively connected to an associated one of said $2^y$ binary storage elements in an associated memory read-out means and all gates in each set being operatively connected to the same column of said buffer storage devices;
and wherein said transfer means further includes:
decoding means connected and responsive to said $y$ address bits for selectively producing one out of $2^y$ word selection outputs, each said word selection output being operatively connected to a corresponding one of said $2^y$ rows of said buffer storage devices, and a corresponding one of said $2^y$ gates in each of said $m$ sets of gates;
whereby energization of one of said word selection outputs transfers manifestations of an $m$-bit binary word between the selected rows of said buffer storage devices and the similarly positioned binary storage element in said $m$ memory read-out means.

References Cited

UNITED STATES PATENTS

| | | | |
|---|---|---|---|
| 3,185,966 | 5/1965 | Bennett et al. | 340—172.5 |
| 3,222,653 | 12/1965 | Rice | 340—172.5 |
| 3,226,692 | 12/1965 | Fuller et al. | 340—172.5 |
| 3,239,818 | 3/1966 | Petersen et al. | 340—172.5 |
| 3,229,253 | 12/1966 | Logue | 340—172.5 |
| 3,268,875 | 12/1963 | Schaffer | 340—172.5 |

PAUL J. HENON, *Primary Examiner.*

HARVEY E. SPRINGBORN, *Assistant Examiner.*

PO-1050
(5/69)

UNITED STATES PATENT OFFICE
CERTIFICATE OF CORRECTION

Patent No. 3,436,734 Dated April 1, 1969

Inventor(s) James H. Pomerene and Richard W. Melville

It is certified that error appears in the above-identified patent and that said Letters Patent are hereby corrected as shown below:

Column 3, line 63, the word "member" should read -- number --;
Column 4, line 15, the words "line swill" should read -- lines will --;
Column 6, line 10, after "through" and before "7" insert -- word --;
Column 6, line 12, the word "probided" should read -- provided --;
Column 6, line 32, delete "data registers. It should be clear at this time, that" and insert -- from the addressed locations of all the BOMs to the --;

SIGNED AND
SEALED
MAR 17 1970

(SEAL)
Attest:

Edward M. Fletcher, Jr.
Attesting Officer

WILLIAM E. SCHUYLER, JR.
Commissioner of Patents